A. SCHAEFER.
TRANSPLANTER.
APPLICATION FILED MAR. 23, 1918.
1,266,634.
Patented May 21, 1918.
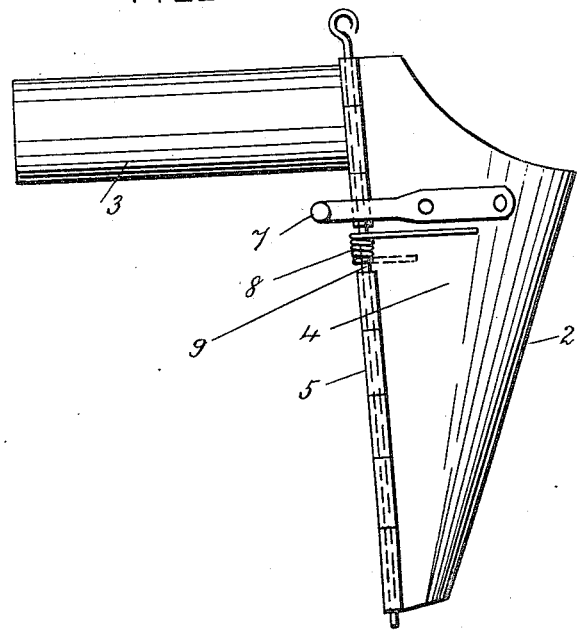
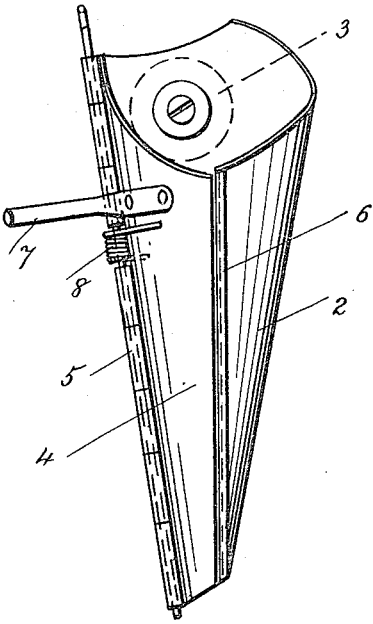
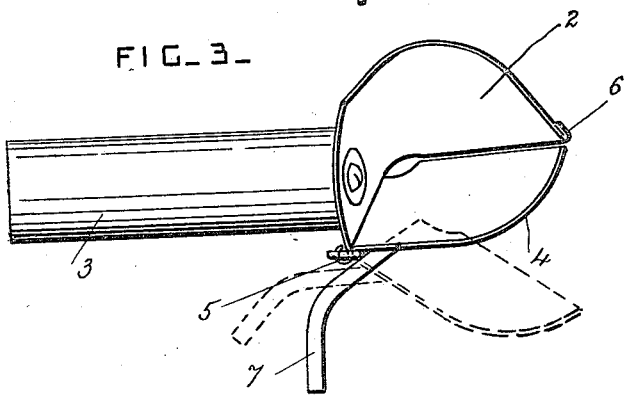
Inventor
Anton Schaefer
by Herbert W.␣Jenner.
Attorney.

UNITED STATES PATENT OFFICE.

ANTON SCHAEFER, OF SPRING GROVE, ILLINOIS.

TRANSPLANTER.

1,266,634.  Specification of Letters Patent.  Patented May 21, 1918.

Application filed March 23, 1918. Serial No. 224,195.

*To all whom it may concern:*

Be it known that I, ANTON SCHAEFER, a citizen of the United States, residing at Spring Grove, in the county of McHenry and State of Illinois, have invented certain new and useful Improvements in Transplanters, of which the following is a specification.

This invention relates to devices for transplanting plants and flowers; and it consists in the novel construction and combination of the parts hereinafter fully described and claimed.

In the drawings, Figure 1 is a side view of a transplanter constructed according to this invention. Fig. 2 is a front view, and Fig. 3 is a plan view, of the same.

A conical plant holder 2 is provided, and is formed in two sections longitudinally. The main section has a handle 3 secured rigidly to the back of its upper end portion and projecting rearwardly at substantially a right angle to the axis of the conical plant holder. A movable section 4 is pivoted to the main section of the plant holder by a hinge 5 arranged at the rear part of the plant holder. The edges of the two sections meet at the front side of the plant holder, and the front edge 6 of the main section is thickened or reinforced to strengthen it.

A finger piece 7 is secured to the hinged section 4, and projects laterally to one side of the hinge. A spring 8 is provided, and is preferably coiled upon the pivot pin 9 of the hinge, with its end portions bearing against the respective sections of the plant holder.

This spring normally holds the hinged section closed, as shown in full lines in Fig. 3. The plant holder is opened, as indicated by dotted lines in Fig. 3, by means of the finger piece, so that the plant may be deposited in the ground, the hole for it being previously formed by thrusting the pointed end of the plant holder into the soil to the required depth.

This tool can be operated by one hand, leaving the other hand free for other work, and it is found to be a very handy and efficient device.

What I claim is:

1. A transplanter, comprising a conical plant holder having a pivoted section, a handle secured to the main portion of the plant holder and arranged at substantially a right angle to its axis, a finger piece which projects laterally from the pivoted section, and a spring which normally holds the pivoted section in a closed position.

2. A transplanter, comprising a conical plant holder having a pivoted section, a handle secured to the main portion of the plant holder and arranged at substantially a right angle to its axis, a finger piece which projects laterally from the pivoted section, and a spring coiled upon the pivot pin of the pivoted section with its end portions bearing against the respective holder sections and operating normally to hold the tool in its closed position.

In testimony whereof I have affixed my signature.

ANTON SCHAEFER.

Copies of this patent may be obtained for five cents each, by addressing the "Commissioner of Patents, Washington, D. C."